Feb. 7, 1950 H. R. LAUBHAN 2,496,728
BATTER DISPENSER
Filed Sept. 30, 1946
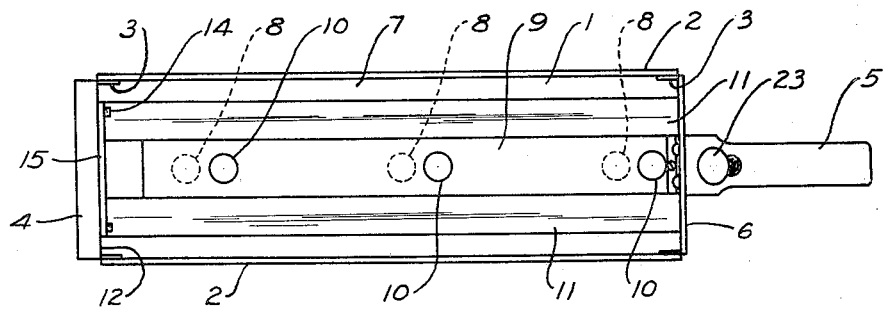
Fig. 1
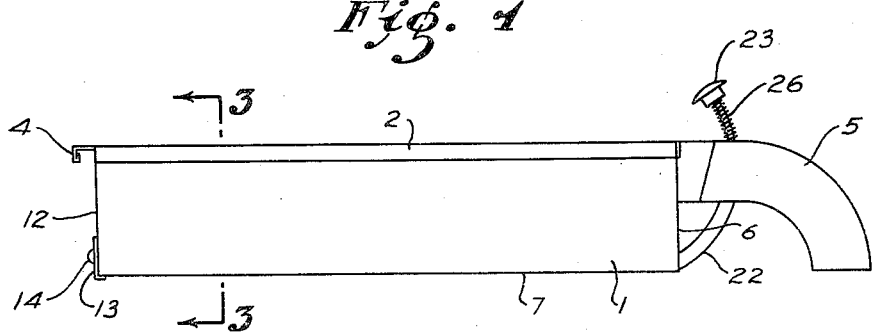
Fig. 2
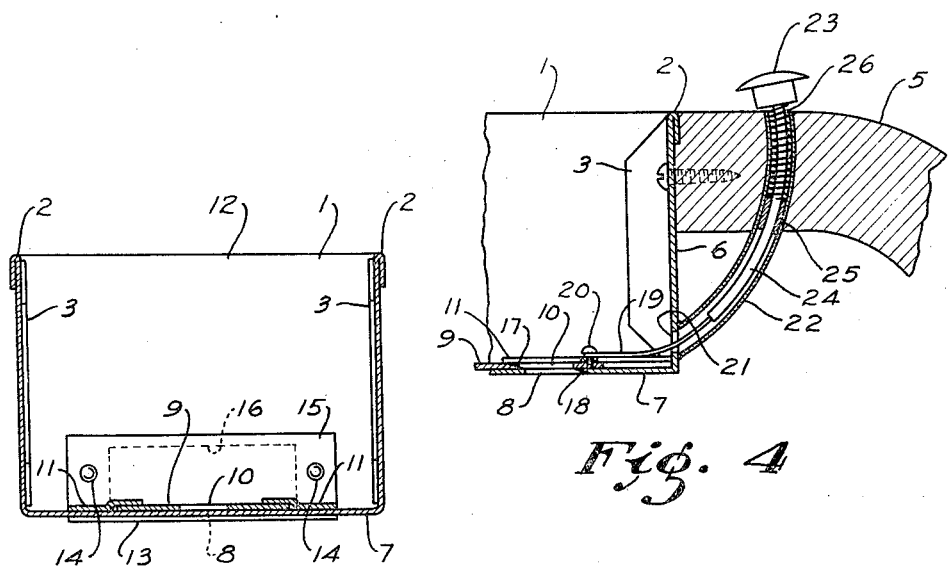
Fig. 4
Fig. 3
INVENTOR
Herman R. Laubhan
BY John Flam
ATTORNEY Patented Feb. 7, 1950

2,496,728

UNITED STATES PATENT OFFICE 2,496,728

BATTER DISPENSER

Herman R. Laubhan, Inglewood, Calif.

Application September 30, 1946, Serial No. 700,243

3 Claims. (Cl. 107—52)

This invention relates to a device for depositing cake batter upon a hot cooking surface.

Ordinarily, hot cakes are made by dipping a spoon of proper size in a receptacle containing batter, and depositing the batter from the spoon onto a heated surface. The cook handling the batter must not only attempt to provide uniform quantities of the batter, but he must take care to space the batter on the cooking surface sufficiently to prevent the cakes from flowing together. Furthermore, since the batches of batter are placed successively upon the stove, the cakes are not done at the same time.

It is one of the objects of this invention to make it possible to start the cooking of the cakes simultaneously.

It is another object of this invention to ensure that the quantity of batter used for each cake will be substantially uniform.

It is still another object of the invention to make it possible to space the cakes on the cooking surface in such manner that the cakes will not flow together.

Although the device is useful for dispensing batter for hot cakes, it may, as well, be used for dispensing other mixtures intended to be cooked, such as for cookies, or other types of cakes.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is a plan view of a dispenser incorporating the invention;

Fig. 2 is a side elevation thereof;

Fig. 3 is an enlarged sectional view, taken along a plane indicated by line 3—3 of Fig. 2; and Fig. 4 is an enlarged fragmentary longitudinal section illustrating the mechanism for operating the dispenser.

The dispenser, in this instance, includes container 1, preferably formed of sheet metal with rolled edges 2. A single sheet may be utilized, the corners being formed by the overlapping tabs 3. The left-hand edge is shown as extended to form a grip or rest 4. A handle 5, at the right-hand end, is appropriately fastened to the end wall 6 of the container 1.

The container 1 is intended to accommodate batter for making hot cakes, or any other mass or mixture having some viscosity and forming the raw material for bakery products, such as cakes and cookies.

This batter is discharged through the bottom wall 7 (Fig. 3) of the container through a plurality of apertures 8, three being shown in this instance. These apertures are circular. The area of the apertures, as well as their spacing, are chosen to conform with the requirements of the cooking. Thus, when the apertures 8 are uncovered as, for example, in the position shown in Fig. 4, the batter can flow downwardly onto a cooking surface, such as a hot plate. All of the plurality of apertures discharge their quantity of batter simultaneously and, when the cook or operator so desires, he can cover the apertures 8 and thereby stop the flow of batter.

By this process, it is insured that the baking of all the cakes begins simultaneously. Furthermore, the apertures 8 are spaced far enough apart so that the cakes do not coalesce or flow together. For large cakes, of course, the apertures 8 are made quite large, and a considerable amount of batter is discharged in one operation. For smaller cakes the apertures 8 may be made correspondingly smaller, and they may be spaced closer together.

Covering and uncovering of the apertures 8 are accomplished by a slide 9. This slide 9 is provided with corresponding apertures 10 that may optionally be placed into register with the apertures 8, as indicated in Fig. 4.

The edges of the slide 9 are guided longitudinally of the container 1 and held in contact with the bottom 7 by the aid of the metal guide strips 11. These strips may be appropriately attached by welds, or the like, to the bottom of the container.

The size of the openings 10 may be used to control the rate of flow of the batter, rather than the size of openings 8. In order to make it possible readily to replace different types of slides, the rear wall 12 of the container is provided with an opening 16 (Fig. 3), closed by a removable cover 13. When the cover 13 is removed, the slide 9, after it is disconnected from its operating means, may be passed through the opening, and another slide substituted.

In order to provide an anchor for the fastening means 14 of cover 13, a plate 15 of plastic material, or the like (Figs. 1 and 3) is placed inside of the container through which the fastening means 14 may pass. This plate 15 also serves as an abutment limiting movement of the slide 9 toward the left. In this way, movement of the slide 9 to align the apertures 8 and 10 is definitely determined.

As shown most clearly in Fig. 4, those edges of apertures 8 and 10 that perform the cutting off of the batter are tapered to form knife edges, as indicated at 17 and 18.

Movement of the slide 9 is accomplished by mechanism supported by the aid of the container 1 and the handle 5. Thus, a relatively stiff wire or rod 19 is detachably joined to the right-hand end of the slide 9, as by the aid of a screw 20 which passes through an eye formed on the wire 19. This rod 19 passes through an opening 21 near the bottom of the wall 6 and into a curved tube 22 that extends upwardly and through the handle 5. This curved tube may be joined, as by a weld, to the wall 6. The wire 19 can be manipulated, as by the aid of a push button 23 attached to the rod 24, and that carries the wire 19. This rod 24 is curved to conform with the curvature of the tube 22, and is guided by a bushing 25 located below the top of the tube 22. A coil spring 26 is disposed around the rod 24, its lower end resting on top of the bushing 25 and its upper end abutting the lower surface of the bottom 23. This spring is strong enough to cause the slide 9 to move toward the right and into contact with the rear wall 6. However, by pressing the button 23 to the position of Fig. 4, the slide 9 is moved toward the left until the apertures 8 and 10 are in alignment.

The use of the device is apparent from the foregoing. The container 1 may be filled with batter and then may be held, by the aid of the handle 5 and the extension 4, in proper position above the baking surface. Then, by depressing the button 23 for a short interval, a desired amount of batter is disposed in uniform quantities and in even spaces. Since it is possible rapidly to discharge a succession of rows of batter, a large quantity of cakes can be baked substantially simultaneously.

The inventor claims:

1. In a dispenser: a container having uniformly spaced apertures in its bottom, and adapted to hold a viscous material to be dispensed; a slide valve controlling said apertures disposed in the container, the ends of the container extending below the slide to provide surfaces limiting movement of the slide between fully open and fully closed position; a handle carried by the container; means on said handle having a curved passageway directed downwardly and toward the bottom of the container, and opening upwardly of the handle; and a rod extending through said curved passageway connected to the slide for operating it, and manipulated from the handle.

2. In a dispenser: a container having uniformly spaced apertures in its bottom, and adapted to hold a viscous material to be dispensed; a slide valve controlling said apertures disposed in the container, the ends of the container extending below the slide to provide surfaces limiting movement of the slide between fully open and fully closed position; a handle carried by the container; means on said handle providing a curved passageway directed downwardly and toward the bottom of the container, and opening upwardly of the handle; a rod extending through said passageway connected to the slide for operating it, and manipulated from the handle; and a coiled spring surrounding the rod for urging it to cause the slide to close the openings.

3. In a dispenser: a container having uniformly spaced apertures in its bottom arranged in a row, and adapted to hold a viscous material to be dispensed; a slide valve disposed in the container above said bottom and having apertures corresponding to the apertures in said bottom; the ends of the container extending below the slide to provide surfaces limiting movement of the slide between fully open and fully closed positions; a handle carried by the container; means on said handle having a curved passageway leading to the bottom of the container and opening upwardly of the handle; and a rod extending through said curved passageway and connected to the slide, said rod being manipulated from the handle for shifting the slide.

HERMAN R. LAUBHAN.

REFERENCES CITED

The following references are of record in the file of this patent:

UNITED STATES PATENTS

| Number | Name | Date |
| --- | --- | --- |
| 256,854 | Plumb | Apr. 25, 1882 |
| 421,282 | Jackson | Feb. 11, 1890 |
| 533,655 | Lomax | Feb. 5, 1895 |
| 663,629 | Hoffman | Dec. 11, 1900 |
| 844,883 | Lysinger | Feb. 19, 1907 |
| 939,066 | McCreery | Nov. 2, 1909 |
| 1,157,537 | Hess | Oct. 9, 1915 |

FOREIGN PATENTS

| Number | Country | Date |
| --- | --- | --- |
| 329,536 | Germany | Aug. 7, 1919 |
| 395,896 | Germany | May 19, 1924 |